United States Patent [19]

Hassler, Jr. et al.

[11] Patent Number: 5,095,632

[45] Date of Patent: Mar. 17, 1992

[54] COMPOSITE STRUCTURE UNIDIRECTIONALLY STABLE WITH RESPECT TO THERMAL AND MOISTURE EXPANSION

[75] Inventors: William L. Hassler, Jr., El Toro; Stephen F, McCleskey, Brea, both of Calif.

[73] Assignee: Parker Hannifin Corporation, Cleveland, Ohio

[21] Appl. No.: 539,107

[22] Filed: Jun. 15, 1990

[51] Int. Cl.$^5$ ............................................. G01B 3/10
[52] U.S. Cl. ...................................... 33/493; 33/702; 33/704; 33/771; 528/388
[58] Field of Search ............... 33/493, 483, 486, 492, 33/702, 703, 704, 487, 488, DIG. 19, 701, 771, 760, DIG. 11; 528/388; 427/177; 425/114

[56] References Cited

U.S. PATENT DOCUMENTS

| | | | |
|---|---|---|---|
| 2,472,229 | 6/1949 | Peterson | 33/492 |
| 2,579,664 | 12/1951 | Gleasman | 33/492 |
| 2,659,153 | 11/1953 | Beeber | 33/771 |
| 2,820,296 | 1/1958 | Fabian | 33/704 |
| 2,994,958 | 8/1961 | Beeber | 33/771 |
| 3,042,990 | 7/1962 | Zelnick | 33/771 |
| 3,409,988 | 11/1968 | Zelnick | 33/771 |
| 4,459,753 | 7/1984 | Nagasawa et al. | 33/771 |
| 4,690,972 | 9/1987 | Johnson et al. | 528/388 |
| 4,792,481 | 12/1988 | O'Connor et al. | 427/177 |
| 4,900,499 | 2/1990 | Mills | 425/114 |

FOREIGN PATENT DOCUMENTS

| | | | |
|---|---|---|---|
| 262275 | 11/1988 | Fed. Rep. of Germany | 33/771 |
| 104201 | 5/1986 | Japan | 33/771 |

*Primary Examiner*—William A. Cuchlinski, Jr.
*Assistant Examiner*—C. W. Fulton
*Attorney, Agent, or Firm*—Christopher H. Morgan

[57] ABSTRACT

A structure which has a low coefficient of thermal and moisture expansion along one dimension (an axis) is formed of an arrangement of fibers surrounded by and bonded to an engineering thermoplastic resin. The fibers are arranged so that essentially all of the fibers are disposed parallel to the axis. The fibers have a negative coefficient of expansion, the resin has a positive coefficient of expansion, and the volume ratio is balanced so that the composite structure has a near zero coefficient of expansion. Perferably the structure is formed by pultrusion of overlapped tapes of aligned carbon fibers preimpregnated with polyphenylene sulfide. A scale having this structure has slots for indicating position on the scale. The slots extend through the scale and are transverse to the axis.

15 Claims, 1 Drawing Sheet

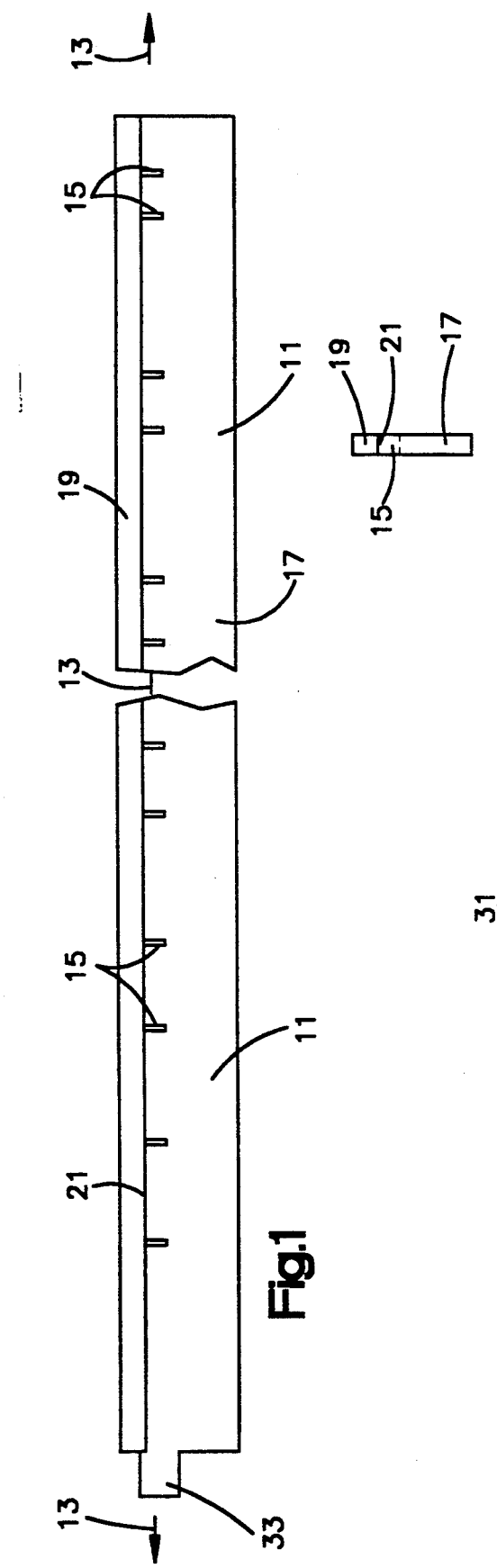
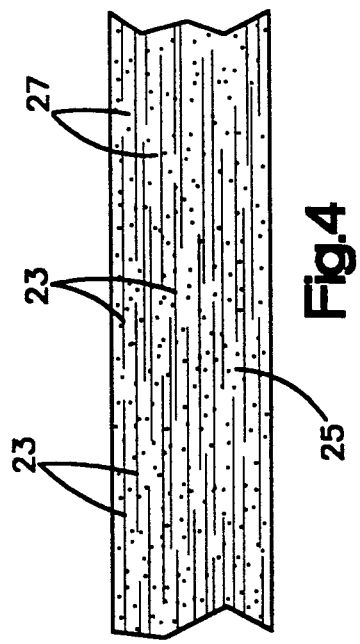

COMPOSITE STRUCTURE UNIDIRECTIONALLY STABLE WITH RESPECT TO THERMAL AND MOISTURE EXPANSION

BACKGROUND OF THE INVENTION

1. Field of the Invention

The present invention relates to structures which are unidirectionally stable with respect to thermal and moisture expansion. In other words, the structures have an overall coefficient of thermal expansion and moisture expansion of approximately zero in one direction. More particularly, but without limitation, the present invention relates to longitudinal scales which are dimensionally stable along the length thereof.

2. Description of the Prior Art

There is a great need for and a wide variety uses for products and structures which are dimensionally stable despite significant changes in their temperature. Many products which are subjected to wide variations in temperature must have coefficients of thermal expansion near zero in order to reduce the stresses and strains on the connected elements of these products. In other products, small movements due to temperature changes are unacceptable to the use of the product. For example, in the fields of measurement or position detection, movements of the elements of the product due to thermal expansion can cause errors in the measurement or position detected. This is especially true of longitudinal scales which are used in position detection.

In the past, the most commonly used dimensionally stable product has been fused silica glass of a type which has a low coefficient of thermal expansion. For example, glass scales etched with position markings have been commonly used in position detectors when extreme accuracy is required. A problem, however, with the fused silica glass is that it is expensive, difficult to machine or form, difficult to mark and brittle in its usage. Moreover, many applications require a product which is not transparent which eliminates the use of this type of glass.

Efforts to make other dimensionally stable products have relied on balancing laminations of different thermal expansion materials. A problem with these products, however, is that the connection between the laminations is difficult to achieve and can result in warping of the structure if many laminations are not used.

Another effort at dimensionally stable structures has been the composite fiber-resin materials. It is known that carbon fibers have a negative coefficient of expansion. Resins which have a positive coefficient of expansion can be bonded to the fibers to form a composite structure which is dimensionally stable. For example, a sheet of randomly oriented carbon fibers can be impregnated with a resin such as polyphenylene sulfide and then laminated with several other similarly constructed sheets oriented in different directions to further randomize the orientation of the fibers. The resulting laminations can be fused by a heated press to form a composite structure of low coefficient of thermal expansion. However, because of the hardness of the carbon fibers, this material is relatively difficult to cut or machine. Still further, because the randomization is not perfect and because of variations in densities in various locations on the sheet, it is not possible to achieve a structure which is as dimensionally stable with respect to thermal expansion as desired.

Although dimensionally stable carbon/epoxy composite materials have been successfully applied in outer space applications, they are subject to moisture expansion effects on earth which make them unsuitable for such application.

It is accordingly an object of the present invention to provide a structure which is unidirectionally stable with respect to thermal expansion, i.e., it has a very low distortion due to thermal and moisture effects along a single dimension of the structure. It is also an object of the present invention to provide a method for fabricating this unidirectionally stable structure in a repeatable manner. Still further, it is an object of the present invention to provide a longitudinal scale which is stable with respect to thermal and moisture expansion along the length thereof and will retain these properties over time.

SUMMARY OF THE INVENTION

In accordance with these objects the present invention comprises a composite structure constructed of an arrangement of fibers surrounded by and bonded to a matrix of an engineering thermoplastic resin. The fibers have a negative coefficient of thermal expansion and are arranged so that essentially all of the fibers are oriented parallel to an axis of the structure. The thermoplastic has a positive coefficient of thermal expansion and a small coefficient of moisture expansion. The ratio of the thermoplastic resin to the fiber is balanced such that the overall structure is stable with respect to thermal and moisture induced expansion along the longitudinal axis. The structure has a constant linear density ratio of the resin to the fiber so that the unidirectional stability with respect to thermal expansion is constant along the axis. Preferably the fibers comprise carbon fibers and the resin comprises polyphenylene sulfide.

Also preferably the structure is formed of a plurality of aligned, overlapped, relatively thin and narrow strips of aligned carbon fibers impregnated with thermoplastic resin and bonded together by pulling the strips through a heated die. This process insures a high degree fiber alignment resulting in a uniform product. Also preferably the resulting structure is annealed.

The present invention also provides a linear scale constructed of the type of structure described above. The scale comprises a longitudinal structure having a length axis. It has indicia fixed thereon along the length axis. The resin and fibers are disposed so that the axis of unidirection stability with respect to thermal and moisture expansion is the length axis of the scale. Preferably the indicia are slots which extend transversely to the axis of the scale. Also preferably the structure comprises two longitudinal pieces with the slots disposed along the edge of one piece and with the second piece bonded to this edge.

For a further understanding of the invention and further objects, features and advantages thereof, reference may now be had to the following description taken in conjunction with the accompanying drawings.

DESCRIPTION OF THE DRAWINGS

FIG. 1 is a plan view of a scale constructed in accordance with the present invention.

FIG. 2 is an end view of the scale shown in FIG. 1.

FIG. 3 is a schematic, perspective view of a method of constructing the scale shown in FIG. 1.

FIG. 4 is a schematic representation of a lamination of the type used in the process shown in FIG. 3.

DESCRIPTION OF PREFERRED EMBODIMENTS

The structure of this invention does not attempt, as many dimensionally stable structures attempt, to obtain thermal and moisture stability in multiple directions. Rather, the structure only achieves a unidirectional thermal stability, that is, thermal and moisture expansion near zero along one axis only. Thermal and moisture expansion in other directions is disregarded. This allows an improved stability to be achieved along the axis and provides an otherwise improved product.

FIGS. 1 and 2 illustrate a scale 11 constructed in accordance with the present invention. This longitudinal scale structure 11 is illustrative of the structures which are usefully constructed in accordance with the present invention. Particularly, the scale 11 has a longitudinal axis 13 with markings provided along the axis 13 for measurement. The markings shown in FIGS. 1 and 2 are slots 15 which extend transversely to the axis 13 and through the scale 11.

As illustrated in FIGS. 1 and 2 the slots 15 are arranged in pairs along the axis 13 so that their combination can be used for identifying a unique relative position along the scale with respect to the end of the scale and their combination can be used to precisely identify the position within that relative location. The means of using a light source and charged coupled device on opposite sides of the scale 11 to interpret these pairs of slots is described in a co-pending patent application Ser. No. 217,015 and filed on July 8, 1988. The scale illustrated in FIGS. 1 and 2 are particularly adapted for use in a position detector of the type described in this application.

It can be seen that the scale 11 is constructed of two longitudinal pieces 17 and 19. The two-piece construction of the scale 11 is necessary in order to allow machining of the slits 15. The piece 17 is bonded to the piece 19 along the entire seam 21 therebetween.

Referring now to FIGS. 3 and 4 as well as FIGS. 1 and 2, the structure 11 is constructed of a composite of fibers and resin. The fibers are arranged so that they are essentially all disposed or arranged parallel to the longitudinal axis 13 of the scale 11. This orientation of essentially all of the fibers is necessary in order to provide the unidirectional stability with respect to thermal expansion achieved by this invention. Surrounding and bonded to the fibers is a matrix of resin. The resin must be uniformly and thoroughly distributed through the fibers in order for the composite structure 11 to have a uniform, low thermal expansion along the axis 13.

The fibers must have a negative coefficient of thermal expansion balanced by a positive coefficient of thermal expansion of the resin. The resin must have a low moisture expansion coefficient and must be resistant to microcracking and creep (time dependent) effects. The balance must be longitudinally uniform and precise. By longitudinally uniform it is meant that the volume ratio of resin to fibers is constant along the axis 13.

Fibers which are suitable for use with the present invention include kevlar and carbon fibers. Carbon fibers are preferred.

The resins which are suitable for use with the present invention are engineering thermoplastic resins such as polyetheretherketone (PEEK), polyethersulphone (PES) and polyphenylene sulfide (PPS). Preferably the resin is a selected one of this group. Most preferred is polyphenylene sulfide.

Carbon fibers laid in unidirectional tape and impregnated with resin can be utilized to form the present invention. A schematic view of one of these lamina tapes is shown in FIG. 4. FIG. 4 illustrates carbon fibers 23 essentially all of which are unidirectionally parallel to the axis of the tape 25. Resin 27 is impregnated throughout the tape. The tape can be obtained in relatively thin and narrow strips of a type which can be used to form the structure of the present invention. Such tapes are commercially available from Phillips 66 Company under the designation AC40-66. These strips are formed of Ryton brand polyphenylene sulfide resin and AS4 grade carbon fibers. These tapes are approximately 5 ½ mils thick and up to 4 inches wide.

By combining a plurality of these strips as shown in FIG. 3 the structure 11 of the present invention can be formed. A plurality of the tapes 25 are pulled through a heated die 27 with a rectangular orifice 29 receiving the tapes 25 in an overlapped or laminated fashion. A plurality of the tapes is needed in order to construct a structure of sufficient thickness. For example, approximately 18 plies of tape 25 must be overlapped to form a 0.1 inch thick scale 11.

The process of pultruding the laminated strips or tapes provides a much better structure than a heated press formation. The pultrusion provides a pressurized forming which is less likely to result in warping of the resulting structure. It also improves fiber alignment. The pressure and temperature of the pultrusion forming of the structure 31 through the die 27 depends upon the size of the orifice 29 and the fibers and resins used. The process of pultrusion is sufficiently known to those skilled in the art of thermoplastic structure manufacture so that these conditions can be determined without undue experimentation.

Following the pultrusion process, the structure can be annealed to improve the characteristics of the structure. For example, a carbon fiber/PPS structure can be maintained at 350° F. for two hours. This annealing increases the crystallinity and makes the structure more stable.

The quantity of the resin and carbon fibers must be carefully balanced to achieve a combined thermal expansion along the axis 13 which is near zero. The ratio of the resin and fibers must be longitudinally uniform and balanced against thermal expansion.

By balanced against thermal expansion it is meant that the force exerted by thermal expansion of the fibers is equal to but opposite the force exerted by thermal expansion of the resin over a desired temperature range. The mathematical representation of this balance is:

1. $F_F = -F_R$     (1)

2. $\epsilon_F = \epsilon_R$     (2)

3. $\Delta T_F = \Delta T_R = \Delta T$     (3)

where
    $F_F$ = the force of the fibers
    $F_R$ = the force of the resin
    $\epsilon_F$ = the strain of the fibers
    $\epsilon_R$ = the strain of the resin
    $\Delta T_F$ = the change in temperature of the fibers
    $\Delta T_R$ = the change in temperature of the resin
    $\Delta T$ = the change in temperature of the composite structure.

Then, using the one-dimensional formulas for stress and strain:

$$\sigma_F = \frac{F_F}{A_F} \qquad 4.$$

$$\sigma_R = \frac{F_R}{A_R} \qquad 5.$$

$$\epsilon_F = \frac{1}{E_F} \sigma_F + \alpha_F(\Delta T_F) \qquad 6.$$

$$\epsilon_R = \frac{1}{E_R} \sigma_R + \alpha_R(\Delta T_R) \qquad 7.$$

where $\sigma_F$ = stress of the fibers
$\sigma_R$ = stress of the resin
$A_F$ = the cross sectional area of the fibers
$A_R$ = the cross sectional area of the resins
$\alpha_F$ = the coefficient of thermal expansion of the fibers
$\alpha_R$ = the coefficient of thermal expansion of the resins
$E_F$ = Young's modulus of the fibers
$E_R$ = Young's modulus of the resin.

These can be converted to:

$$\frac{\sigma_F}{E_F} + \alpha_F(\Delta T) = \frac{\sigma_R}{E_R} + \alpha_R(\Delta T) \qquad 8.$$

and $$\frac{\sigma_F}{E_F} - \frac{\sigma_R}{E_R} = \Delta T(\alpha_R - \alpha_F) \qquad 9.$$

$$F_F\left(\frac{1}{E_F A_F} + \frac{1}{E_R A_R}\right) = \Delta T(\alpha_R - \alpha_F) \qquad 10.$$

$$F_F = \left(\frac{E_F E_R A_F A_R}{E_F A_F + E_R A_R}\right)(\alpha_R - \alpha_F)\Delta T \qquad 11.$$

$$\epsilon_F = \frac{E_R A_R}{E_F A_F + E_R A_R}(\alpha_R - \alpha_F)\Delta T + \alpha_F \Delta T \qquad 12.$$

$$\frac{E_R A_R}{E_F A_F + E_R A_R} = C \text{ where } C \text{ is a constant} \qquad 13.$$

Then for $\epsilon_F = 0$ $$14.\; 0 = C\alpha_R - C\alpha_F + \alpha_F \qquad (14)$$

$$\frac{C-1}{C} = \frac{\alpha_R}{\alpha_F} \qquad 15.$$

$$\frac{\frac{E_R A_R}{E_F A_F + E_R A_R} - 1}{\frac{E_R A_R}{E_F A_F + E_R A_R}} = \frac{\alpha_R}{\alpha_F} \qquad 16.$$

$$\frac{\frac{E_R A_R - E_F A_F - E_R A_R}{E_F A_F + E_R A_R}}{\frac{E_R A_R}{E_F A_F + E_R A_R}} = \frac{\alpha_R}{\alpha_F} \qquad 17.$$

$$\frac{-E_F A_F}{E_R A_R} = \frac{\alpha_R}{\alpha_F} \qquad 18.$$

-continued $$\frac{A_F}{A_R} = \frac{-E_R \alpha_R}{E_F \alpha_F} \qquad 19.$$

Then, since the structure has a uniform longitudinal ratio of fibers and resin, the volume ratio is equal to the ratio of the cross sectional areas.

Utilizing the above formula the volume ratio and the longitudinal ratio of fibers and resins can be determined to properly balance the ratio of the fibers 23 and resin 27 in the tape 25. Similar expressions can be derived to express moisture expansion behavior.

If the properties of AS4 grade carbon fibers and polyphenylene sulfide resin are used in the above formula, a product with a zero coefficient of thermal expansion along the axis 13 can be obtained. In addition, because polyphenylene sulfide has such a low moisture expansion coefficient, the product is also dimensionally stable even in very humid environments. Thus, the product is resistant to axial distortion due to changes in temperature and relative humidity and retains this stability over time.

An example structure was constructed as described above using 56 percent by volume carbon fibers/44 percent by volume polyphenylene sulfide (since the most desired ratio of 60 percent carbon fibers was not available). The theoretical coefficient of thermal expansion along axis 13 was calculated to be 0.22 parts per million per °C. The measured thermal expansion along the axis of the product was 0.29 parts per million per °C., conforming very closely to the theoretical.

Once the rectangular, longitudinal pieces 31 are obtained by pultrusion through the die 27, these pieces can be cut into the form of the piece 17 and the piece 19 shown in FIG. 1. Because of the unidirectional orientation of the fibers, the structure can be easily cut parallel to the axis 13. Thus, cutting and forming of the structure of the present invention is much improved compared to structures having randomly oriented fibers.

The slots 15 can be cut into the pieces 17 prior to the bonding of the two. The slots 15 can be cut into a number of pieces 17 by placing a plurality of pieces 17 side by side, clamping them together in this position and then using a diamond saw or the like to cut each of the slots 15 through all of the side-by-side pieces 17 at one time. If desired an array of saws properly positioned to form the pairs 15 could be utilized to cut all of the slots 15 in all of the pieces 17 at the same time.

Following the formation of the slots 15, the side piece 19 can be bonded to the piece 17. This bonding can be achieved by applying an epoxy glue along the seam or edge 21 except for the positions adjacent the slots 15 and clamping the pieces 17 and 19 together.

A tongue 33 is provided on scale 11 to allow mounting of the scale in a way which prevents stresses from being applied to the scale due to the thermal expansion of other parts. Thus, a point on the tongue 33 can be used as the reference point of the scale and the remainder of the scale 11 will be free from stresses along the longitudinal axis 13 with respect to the reference point.

Thus, the present invention is well adapted to achieve the objects and advantages mentioned as well as those inherent therein. It will be appreciated that the specification and claims are set forth by way of illustration and not of limitation, and that various changes and modifications may be made without departing from the spirit and scope of the present invention

What is claimed is:

1. A composite structure unidirectionally stable with respect to thermal and moisture expansion comprising:
   a plurality of layers of fibers, said fibers having a negative coefficient of thermal expansion, essentially all of said fibers in each of said layers being oriented parallel to an axis; and
   a matrix of engineering thermoplastic resin, having a positive coefficient of thermal expansion and low coefficient of moisture expansion, surrounding and bonded to said layers of fibers to form a structure, said resin and said fiber having a constant linear density ratio along said axis which is balanced against thermal expansion so that said structure is unidirectionally stable with respect to thermal expansion along said axis, said structure of fibers and resin being sufficiently thick to form a unidirectionally stable linear structure.

2. The structure of claim 1 wherein said fibers comprise carbon fibers.

3. The structure of claim 1 wherein said resin comprises a selected one of the group of polyetheretherketone, polyethersulphone, and polyphenylene sulfide.

4. The structure of claim 3 wherein said thermoplastic material comprises polyphenylene sulfide.

5. The structure of claim 1 wherein said structure is formed of a plurality of aligned, overlapped, relatively thin and narrow strips of aligned carbon fibers impregnated with said thermoplastic resin and bonded together by heat.

6. The structure of claim 1 wherein said structure is formed of a plurality of aligned, overlapped, relatively thin and narrow strips of aligned carbon fibers impregnated with thermoplastic resin and bonded together by pulling said strips through a heated die.

7. The structure of claim 6 wherein said structure is annealed.

8. A linear scale, having a low coefficient of thermal and moisture expansion along the length thereof comprising:
   a longitudinal scale structure having a length axis and indicia fixed thereon along said length axis said scale structure being formed of;
   a plurality of layers of fibers, said fibers having a negative coefficient of expansion, essentially all of said fibers being oriented parallel to said axis; and
   a matrix of engineering thermoplastic resin, having a positive coefficient of thermal expansion and low coefficient of moisture expansion, surrounding and bonded to said fibers, said resin and said fibers having a constant linear density ratio along said axis which is balanced against thermal expansion so that said structure is unidirectionally stable with respect to thermal expansion along said axis.

9. The scale of claim 8 wherein said indicia comprises slots extending through said scale transverse to said axis.

10. The scale of claim 9 wherein said scale structure includes a first longitudinal piece and a second longitudinal piece, said first piece having said slots formed along an edge thereof and said second piece bonded to said first piece along said edge.

11. The scale of claim 10 wherein said fibers comprise carbon fibers.

12. The scale of claim 11 wherein said resin comprises a thermoplastic material selected one of the group of polyetheretherketone, polyethersulphone, and polyphenylene sulfide.

13. The scale of claim 12 wherein said thermoplastic material comprises polyphenylene sulfide.

14. The scale of claim 10 wherein said structure is formed of a plurality of aligned, overlapped, relatively thin and narrow strips of aligned carbon fibers impregnated with thermoplastic resin and bonded together by heat.

15. The scale of claim 10 wherein said structure is formed of a plurality of aligned, overlapped, relatively thin and narrow strips of aligned carbon fibers impregnated with thermoplastic resin and bonded together by pulling said strips through a heated die.

* * * * *